United States Patent
Golinsky

[11] Patent Number: 5,389,933
[45] Date of Patent: Feb. 14, 1995

[54] LINEAR PULSE COMPRESSION RADAR SYSTEM AND METHOD

[75] Inventor: Martin Golinsky, Roslyn Heights, N.Y.

[73] Assignee: Grumman Aerospace Corporation, Bethpage, N.Y.

[21] Appl. No.: 104,013

[22] Filed: Aug. 10, 1993

Related U.S. Application Data

[63] Continuation-in-part of Ser. No. 957,486, Oct. 7, 1992.

[51] Int. Cl.$^6$ ............................................. G01S 13/28
[52] U.S. Cl. ......................................... 342/201; 342/21
[58] Field of Search ................... 342/201, 200, 132, 21

[56] References Cited

U.S. PATENT DOCUMENTS

| | | | |
|---|---|---|---|
| 2,624,876 | 1/1953 | Dicke | 343/13 |
| 4,259,650 | 3/1981 | Donahue | 333/166 |
| 4,313,170 | 1/1982 | Lewis et al. | 364/517 |
| 4,507,659 | 3/1985 | Lewis et al. | 343/17.2 |
| 4,513,288 | 4/1985 | Weathers et al. | 343/17.2 |
| 4,626,853 | 12/1986 | Lee et al. | 342/132 |
| 4,983,979 | 1/1991 | McKenzie | 342/204 |

OTHER PUBLICATIONS

"Introduction to Radar Systems", Merrill I. Skolnik McGraw-Hill, 1980 pp. 422–424.

*Primary Examiner*—Mark Hellner
*Attorney, Agent, or Firm*—Bacon & Thomas

[57] ABSTRACT

A method is described for improving the target-detection performance of a linear pulse compression radar system by reducing the amplitude of the temporal sidelobes contained in the autocorrelation function output of a matched filter receiver. The method involves generating a transmitter signal pulse using a waveform which linearly varies the frequency of a baseband signal between first and second frequencies which are selected so as to optimize the percentage cycle-to-cycle frequency variation in the transmitter signal pulse. In one example, the minimum frequency of the carrier waveform is set close to 0 MHz. Optimization of the percentage cycle-to-cycle frequency variation causes a reduction in the width of the compressed pulse, which the designer may choose to forego, in favor of reducing the amplitude of the temporal sidelobes of the compressed pulse signal output.

10 Claims, 13 Drawing Sheets

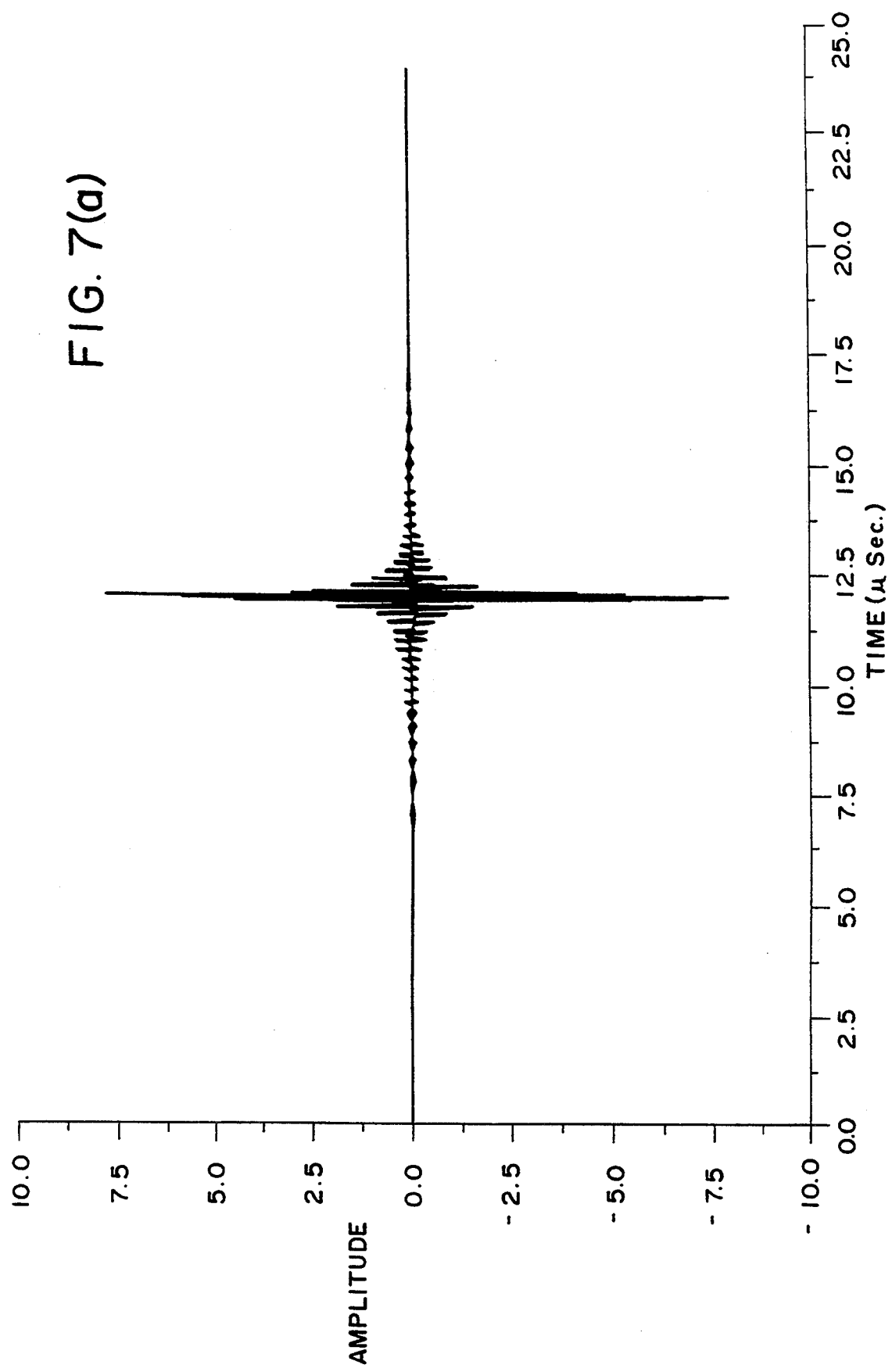

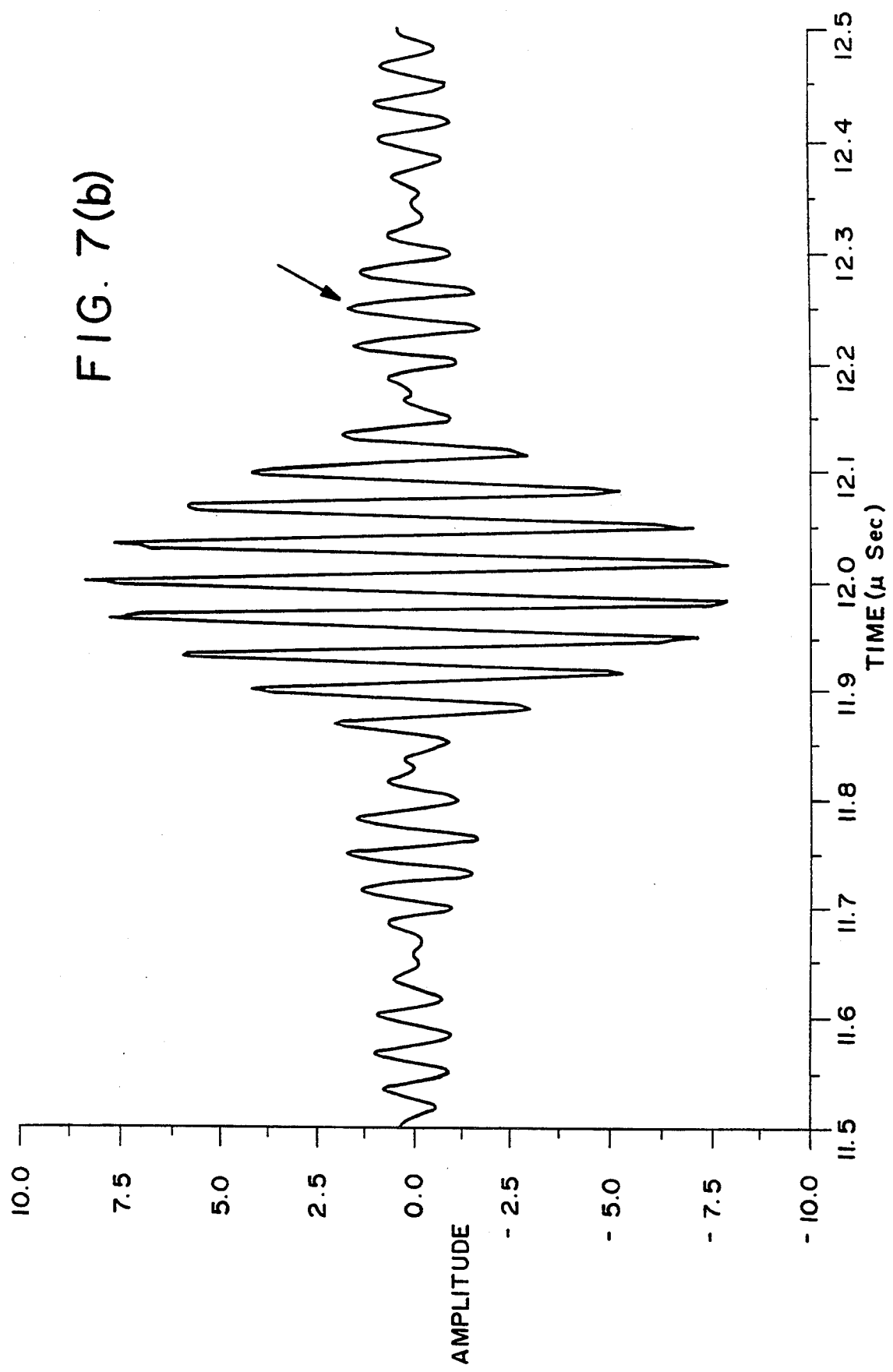

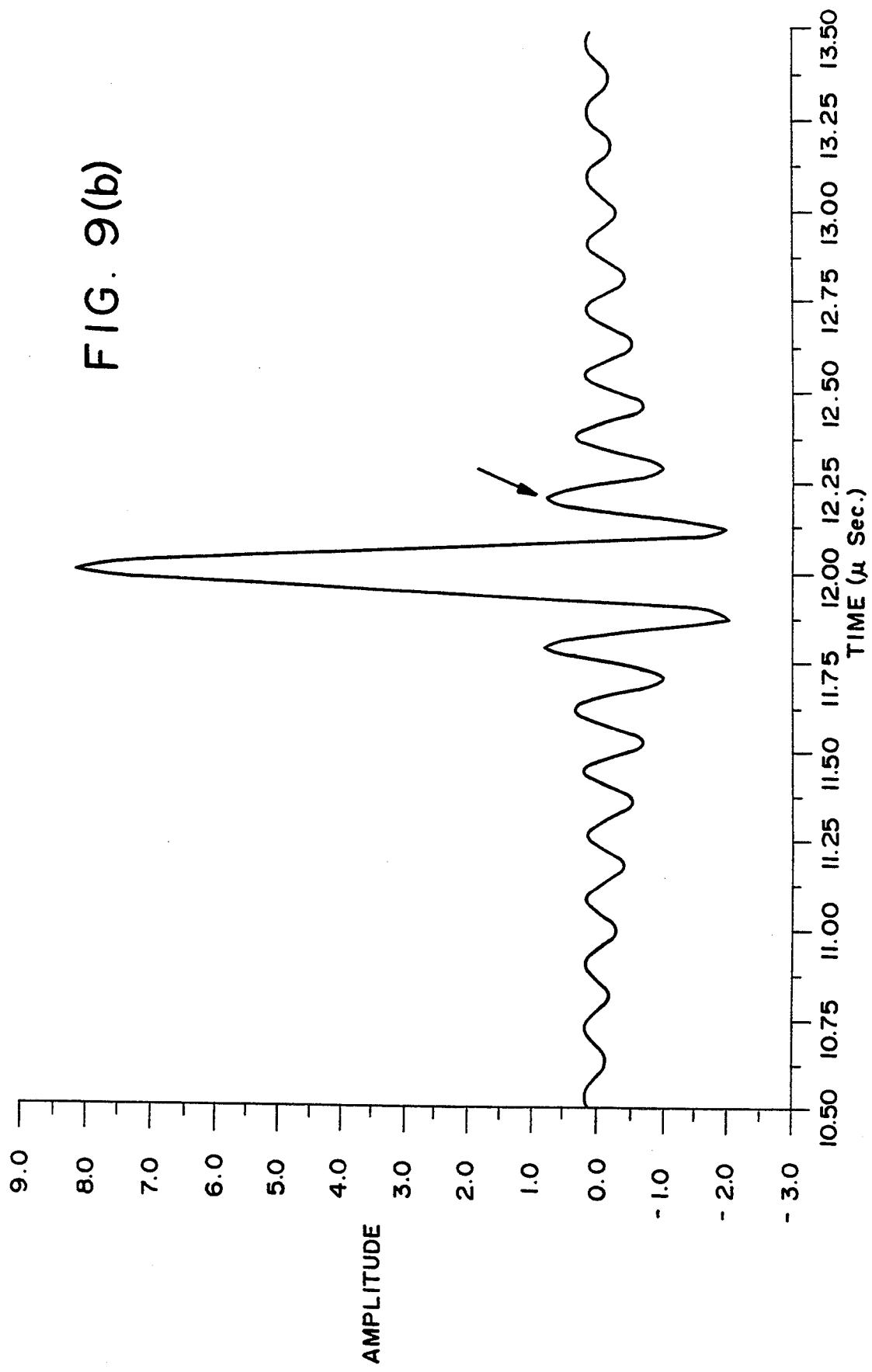

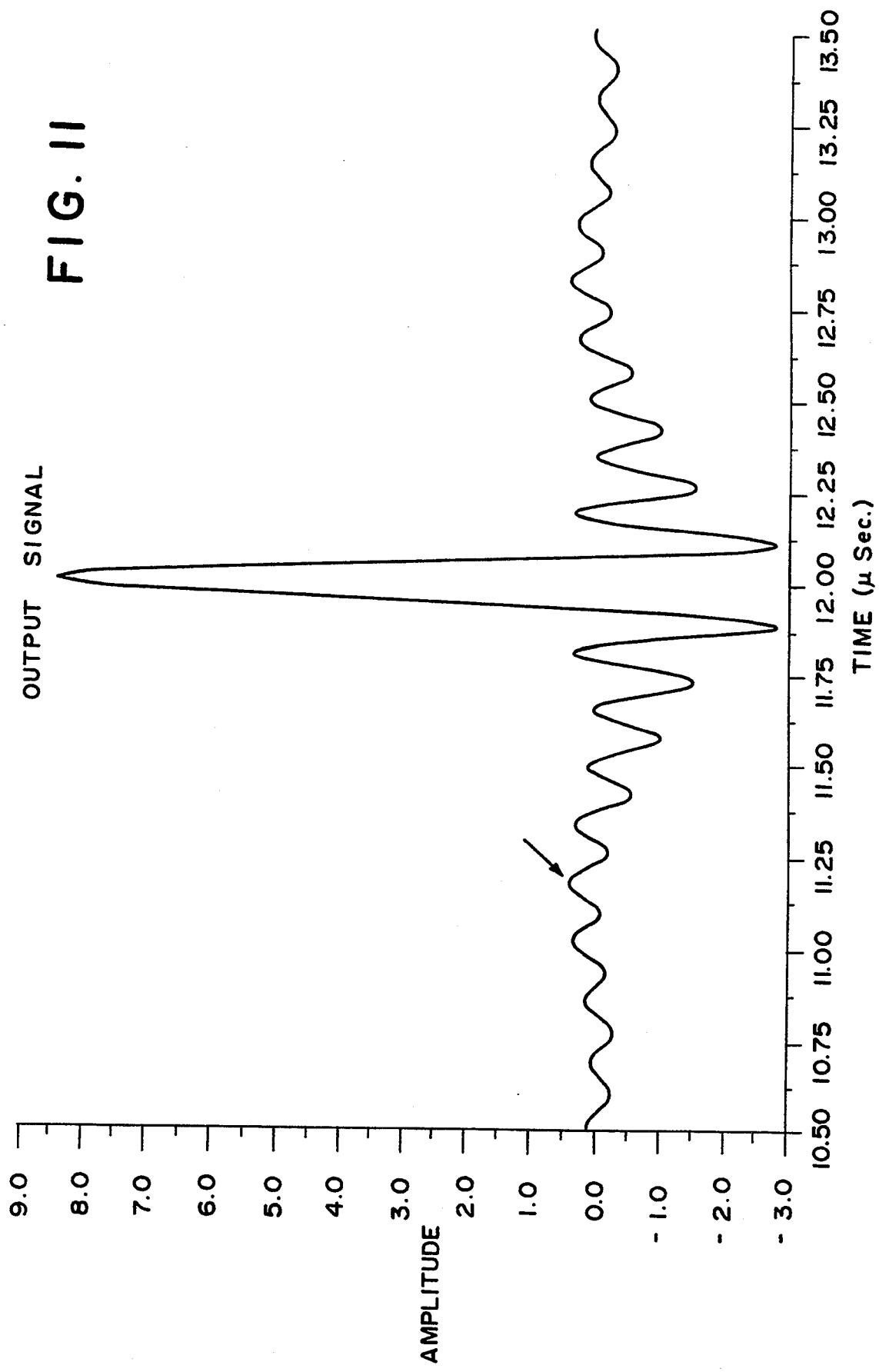

LINEAR PULSE COMPRESSION RADAR SYSTEM AND METHOD

This is a continuation-in-part of patent application Ser. No. 07/957,486, filed on Oct. 7, 1992, pending.

FIELD OF THE INVENTION

The present invention relates generally to improving the target-detection performance of a linear FM pulse compression radar, and, more particularly, to a method for increasing the main-to-side lobe (M/S) ratio of a linear FM pulse compression radar signal by reducing the amplitude of the temporal sidelobes in the autocorrelation function output of a matched filter without a corresponding significant reduction in the amplitude of the main lobe.

BACKGROUND OF THE INVENTION

FIG. 1 shows a block diagram of the basic operation of a conventional linear frequency-modulated (FM) pulse compression radar. The frequency of a pre-selected intermediate frequency (IF) signal pulse is made to vary linearly by any one of several well known methods. Frequency modulator 4 modulates this IF signal, increasing the frequency band with a carrier frequency large enough to effect efficient propagation of the pulse into space. The resulting FM signal pulse is a relatively long-duration, high-carrier-frequency pulse which is transmitted by transmitter 2 along a transmission line to a transmit-receive switch 8. Transmit-receive switch 8 then feeds the FM signal pulse to a directional antenna 10 which radiates the pulse in the form of a directional beam towards a target.

Return echoes of the transmitted FM signal pulses are received by antenna 10 and passed to a receiver 12 via transmit-receive switch 8. The return echo pulses are reduced down to an intermediate frequency when combined with local oscillator 16 in mixer 14. The echo pulses are then amplified by an IF amplifier 18 and directed into a pulse compression filter 20, e.g., a matched filter, which compresses the width of the echo pulses. The output of filter 20 is transformed into video pulses by detector 22 for display to a human operator on an indicator 26, e.g., a cathode ray tube. A linear FM pulse compression radar of this type is disclosed in U.S. Pat. No. 2,624,876.

It is well-known that the output of a matched filter is the autocorrelation function of its input signal. Accordingly, the time response of the output of a matched filter to a linear FM input signal appears as a well-defined narrow autocorrelation peak, or main lobe, surrounded by a plurality of temporal/range sidelobes. The main lobe represents the compressed pulse, while the temporal/range sidelobes can be interpreted as the value of the auto-correlation function at specific time lags. The amplitude of the temporal sidelobes of the compressed pulse signal output of a matched filter are smaller than the amplitude of the main lobe. For example, the peak sidelobe may be located approximately 13.5 dB down from the peak of the main lobe.

Target detection typically is achieved by comparing the amplitude of a compressed pulse signal with a predetermined threshold level. A false target is said to be present if the amplitude of any temporal sidelobe of the compressed pulse envelope exceeds this threshold level. Temporal sidelobes are especially susceptible to corruption.

Thus one of the limitations of conventional linear FM pulse compression radar is that the autocorrelation function output of a matched filter is contaminated with spurious responses which significantly compromise target detection performance.

More specifically, spurious responses in a pulse compression radar signal are objectionable for at least two reasons. First, they can produce false alarms during small-target detection. A false alarm occurs, for example, when the amplitude of any temporal sidelobe exceeds a predetermined threshold level. Second, spurious responses in a pulse compression radar signal can cause small-target suppression, as described in U.S. Pat. No. 4,507,659.

Techniques for reducing the spurious responses, and in turn, the amplitude of the temporal sidelobes of a linear FM pulse compression radar signal, are known. One common method used to reduce the amplitude of the temporal sidelobes is to use weighting functions, e.g., Taylor and Hamming weightings, in the frequency response of the matched filter. Weighting functions, however, reduce signal-to-noise ratio in the output signal, cause sensitivity losses in the matched filter, and consequently reduce the maximum range at which a given target can be detected. Weighting functions also increase the width of the compressed pulse, degrading the range resolution of the radar.

Non-linear pulse compression is another known technique for reducing the amplitude of temporal sidelobes. Successful implementation of this technique, however, requires accurate control of a number of waveform generating parameters, and therefore is more complex and costly than linear FM pulse compression.

Linear FM pulse compression radar is desirable because it permits the use of a long transmitter signal pulse while simultaneously realizing the benefits of large pulse energy and good range resolution of a short pulse. A need therefore exists to provide an effective method for improving the target detection performance of linear pulse compression radar without realizing the disadvantages of the aforementioned techniques.

SUMMARY OF THE INVENTION

Accordingly, it is a principal object of the present invention to provide an improved method for improving the target-detection performance of a linear FM pulse compression radar by increasing the main lobe-to-side lobe ratio of the autocorrelation function output of a matched filter.

It is a further objective of the present invention to provide an improved method for reducing the amplitude of the temporal sidelobes of a linear FM pulse compression radar signal by selecting a signal waveform designed to rapidly decrease the cross correlation between a return echo of a transmitter signal pulse and a time-delayed replica of a transmitter signal pulse in a matched filter receiver.

It is a further objective of the present invention to provide an improved method for reducing the amplitude of the temporal sidelobes of a linear FM pulse compression radar signal by using a design which is simpler than existing techniques.

It is a further objective of the present invention to provide an improved method for reducing the amplitude of the temporal sidelobes of a linear FM pulse compression radar signal which can be implemented on a conventional linear FM pulse compression radar without requiring additional hardware.

It is a further objective of the present invention to provide an improved method for reducing the amplitude of the temporal sidelobes of a linear FM pulse compression radar signal while retaining matched filter sensitivity and the range resolution of a short pulse.

It is a further objective of the present invention to provide an improved method for reducing the amplitude of the temporal sidelobes of a linear FM pulse compression radar signal with reduced hardware requirements achieved through the use of a signal waveform having a lower center frequency that produces a signal output which is already at baseband, therefore eliminating the need for the extraction of the baseband signal by video detection as in conventional linear FM pulse compression radar systems.

The foregoing and other objectives of the invention are achieved by providing an improved method for improving the target-detection performance of a linear pulse compression radar system by reducing the amplitude of the temporal sidelobes contained in the autocorrelation function output of a matched filter receiver. The principal step of the method involves generating a transmitter signal pulse using a signal waveform which linearly varies the frequency of a baseband signal between first and second frequencies which are selected so as to optimize the percentage cycle-to-cycle frequency variation in the transmitter signal pulse. Optimization of the percentage cycle-to-cycle frequency variation causes a corresponding reduction in the amplitude of the temporal sidelobes of the autocorrelation function output of the matched filter. The signal waveform generated in accordance with the present invention also advantageously produces a compressed pulse signal output of the matched filter which is already at baseband, thus eliminating the need to extract the signal using conventional video detection techniques. These and other objects, features and advantages of the invention are disclosed in or apparent from the following description of preferred embodiments of the invention.

BRIEF DESCRIPTION OF THE DRAWINGS

The preferred embodiments are described with reference to the drawings in which:

FIGS. 7a and 7b are graphs showing the time response, on different time scales, of the autocorrelation function output of a matched filter using as an input the transmitter signal pulse shown in FIG. 6;

FIGS. 9a and 9b are graphs showing the time response, on different time scales, of the autocorrelation function output of a matched filter using as an input the transmitter signal pulse shown in FIG. 8;

FIG. 11 is a graph showing the time response of the autocorrelation function output of a matched filter using as an input a transmitter signal pulse that corresponds to an improved signal waveform wherein $f_1$ is set to a value close to 0 MHz.

DESCRIPTION OF THE PREFERRED EMBODIMENTS

The present invention is a method for increasing the M/S ratio of a linear FM pulse compression radar signal through the use of a linear FM waveform having a center frequency set much lower than the center frequencies used to generate conventional linear FM transmitter signal pulses. In order to better understand the invention, a brief discussion of the generation of a linear FM transmitter signal pulse will now be given.

Figure 1:
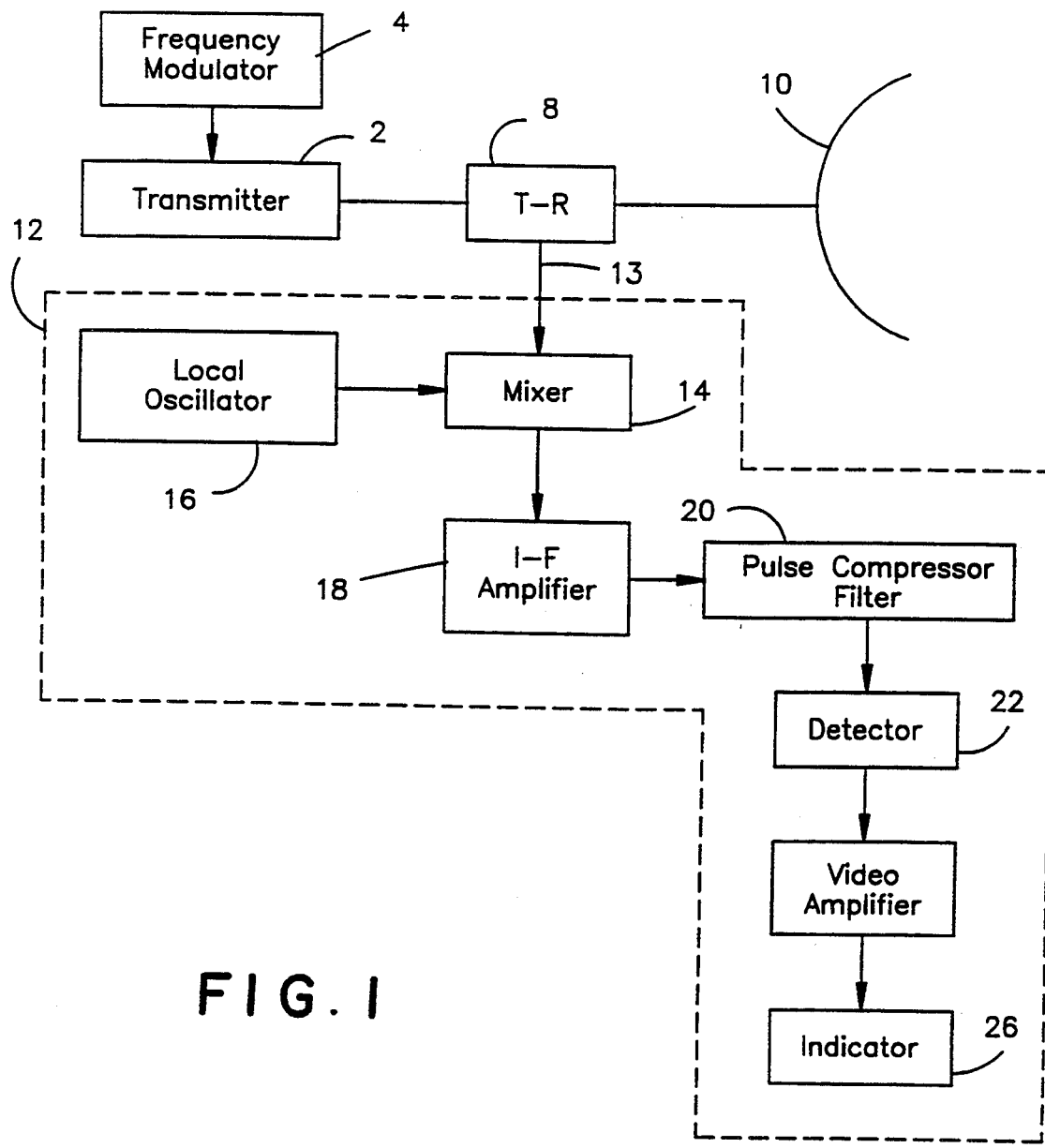
FIG. 1 is a block diagram showing the basic components of a conventional linear FM pulse compression radar.
Figure 2:
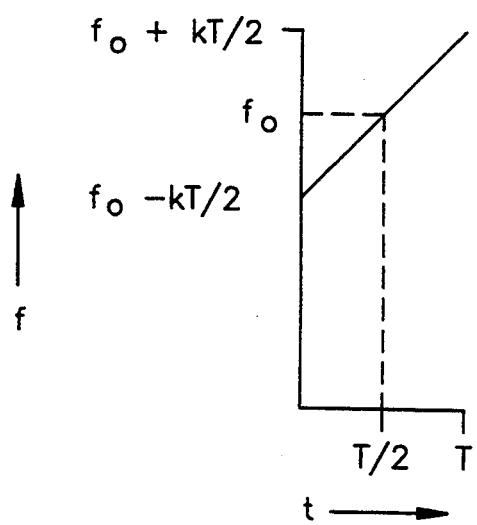
FIG. 2 is a graph showing a typical linear frequency versus time relationship of a theoretical waveform used to generate a transmitter signal pulse to be transmitted by a conventional linear FM pulse compression radar.

FIG. 2 depicts a theoretical waveform used for generating a transmitter signal pulse for a linear FM pulse compression radar. The frequency of the waveform linearly increases between a minimum frequency $f_1 = f_0 - B/2$ and a maximum frequency $f_2 = f_0 + B/2$ over a long pulse length T. The center frequency $f_0$ of the carrier waveform is shown at T/2 and the pulse spectral bandwidth $B = f_2 - f_1$. Although frequencies $f_1$ and $f_2$ are selected so that the signal spectrum is wide band, B is a small percentage of $f_0$. Assuming an increasing frequency without loss of generality, the rate of change of frequency k of the carrier waveform is given by $k = B/T$, where T is measured in microseconds and k in MHz/$\mu$sec. Linearly varying the frequency of a carrier waveform is achieved using conventional methods, for example, by varying the frequency of an oscillator.

Figure 3:
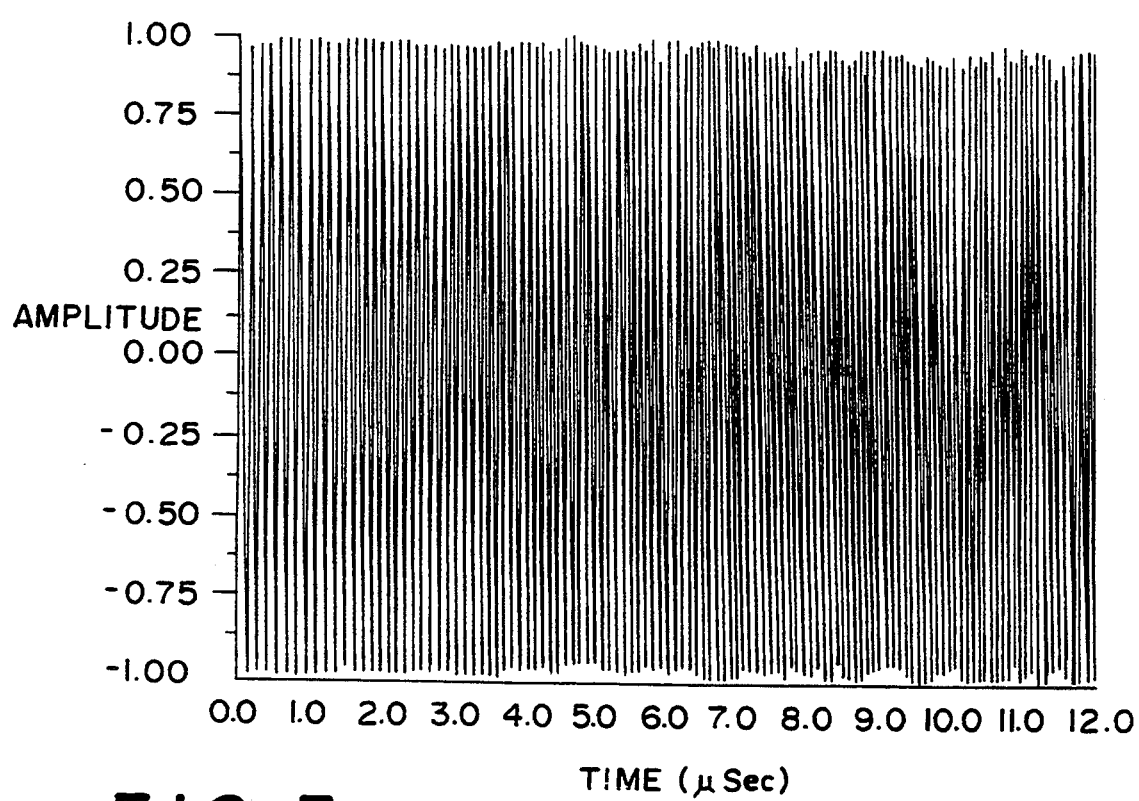
FIG. 3 is a graph showing a transmitter signal pulse generated using the signal waveform in FIG. 2.

FIG. 3 shows a linear FM transmitter signal pulse, frequently called a CHIRP signal, generated using a carrier waveform of the type described above. The cycle-to-cycle frequency variation, i.e., the frequency spread, of the transmitter signal pulse increases over the length of the pulse as the result of the linear increase in frequency of the waveform over that same duration.

A return echo of the transmitter signal pulse is collected by a receiver and then processed by a pulse compression filter. The pulse compression filter used in accordance with the method of the present invention is a matched filter which processes the return echo pulse signal using a predefined pulse compression ratio. Pulse compression ratio CR is defined as a measure of the pulse width compression and the output signal magnification, and is given mathematically by $CR = BT = kT^2$.

The impulse response of a matched filter used to process and compress a returned echo of a transmitter signal pulse is tuned to a time-delayed, time-reversed replica of a transmitter signal pulse. The output of a matched filter is the convolution between its impulse response and an input signal, which is a return echo of a transmitter signal pulse. A matched filter receiver for a linear FM pulse compression radar thus performs a cross correlation between a return echo of a transmitter pulse signal and a time-delayed replica of the transmitter signal pulse. Because the impulse response of the matched filter is tuned to the transmitter signal pulse, the output of the matched filter can be said to be the autocorrelation function of the input signal. Equation 1 shows the output of a matched filter as described above.

$$v_o(t) = \int_{-\infty}^{\infty} v_i(\tau) v_i(t - \tau) d\tau \quad (1)$$

The peak value of the output signal $v_o(t)$ and the compressed pulse width $\tau$ are set forth in equations 2 and 3.

$$v_o = \sqrt{CR} \; v_i \quad (2)$$

where $v_i$ is the amplitude of the input signal.

The method for reducing the temporal sidelobes of a pulse compression signal in accordance with the method of the present invention is based on the discovery that an increase in the percent cycle-to-cycle frequency variation of a transmitter signal pulse will produce a significant reduction in the compressed pulse width resulting in improved range resolution. This improved resolution, which is greater even than the resolution of a conventional linear FM pulse compression radar, can be exchanged by the radar designer for a significant reduction in the amplitude of the temporal sidelobes in the output of the matched filter.

Figure 4:
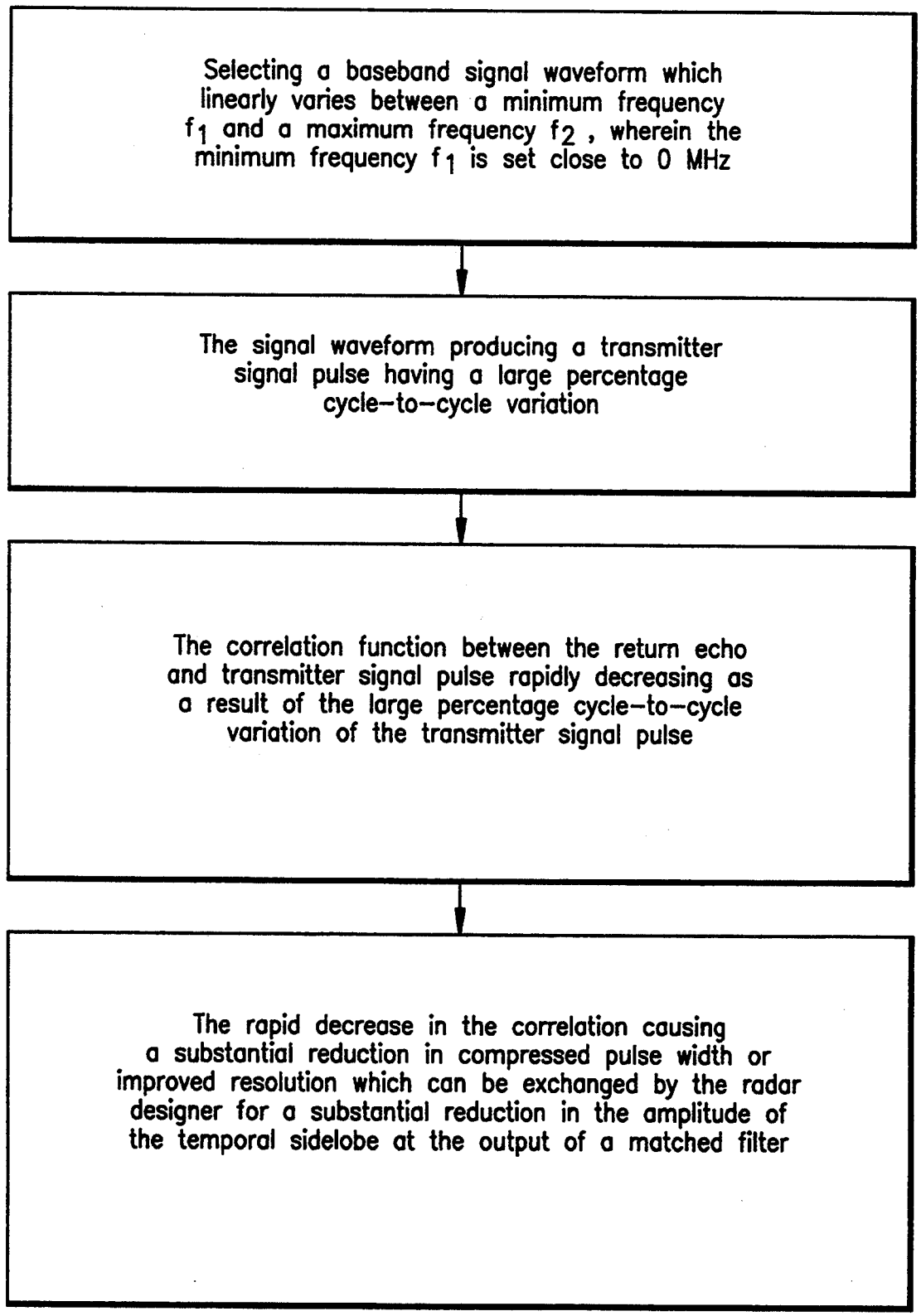
FIG. 4 is a block diagram which sets forth the steps included in the method of the present invention.

FIG. 4 shows a block diagram explaining how the method of the present invention reduces the amplitude of the temporal sidelobes of an autocorrelation output signal from a matched filter. The first step involves selecting a baseband signal waveform for the generation of the transmitter signal pulse whose minimum frequency parameter is set close to 0 MHz. This signal waveform generates a transmitter signal pulse having a large percentage cycle-to-cycle frequency variation. This large percentage cycle-to-cycle frequency variation of the transmitted signal pulse effects a rapid decrease of the cross correlation function between a return echo of a transmitter signal pulse and a time-delayed replica of the transmitter signal pulse applied in the matched filter. This rapidly decreasing cross correlation, in turn, causes a significant reduction in the compressed pulse width, which can be exchanged for a significant reduction in the temporal sidelobes of the time response, i.e., inverse fourier transform, of the output spectrum of the matched filter. This process is explained in greater detail below.

A transmitter signal pulse is formed in accordance with the method of the present invention by linearly varying the frequency of a sinusoidal signal of constant amplitude using a signal waveform having a set of frequency parameters that will result in a large cycle-to-cycle frequency variation in the linear FM transmitter signal pulse. A waveform of this type has one of its frequency parameters, $f_1$ or $f_2$, set to a very small frequency value, for example, a frequency far below a frequency value selected for conventional waveforms. If the slope of the frequency variation is positive, frequency parameter $f_1$ is set to a very small frequency value. If the slope of the carrier waveform is negative, frequency parameter $f_2$ is set to a very small frequency value. Keeping the values of pulse spectral bandwidth B and rate of change of frequency k (and hence the same compression ratio) the same, a waveform of this type advantageously produces a transmitter signal pulse having a large percentage cycle-to-cycle frequency variation, as compared with the percent cycle-to-cycle frequency variation of a conventional transmitted signal. It is imperative that the percentage cycle-to-cycle variation of this transmitter signal be much greater than the percent cycle-to-cycle frequency variation of a linear FM transmitter signal generated from using a conventional waveform in order to achieve the results contemplated by the present invention.

The benefit of generating a transmitter signal pulse having a comparatively greater percent cycle-to-cycle frequency variation is realized by recognizing that this type of signal pulse is a baseband signal pulse. Specifically, applicant has found that a baseband frequency modulated pulse can be used advantageously to reduce the amplitude of the temporal sidelobes which accompany the compressed pulse. The relationship between the baseband nature of the frequency modulated transmitter pulse and the smaller temporal sidelobes will now be explained.

It is well known that when an IF signal having a bandwidth B is video detected, the resulting video bandwidth is halved to B/2. Conversely, when a baseband signal having a bandwidth B is up-converted to IF for transmission, its bandwidth is doubled to 2B. Furthermore, the width of the compressed pulse is approximately the reciprocal of the IF bandwidth. Therefore, when a conventional CHIRP signal is generated at IF and transmitted with a bandwidth B, the width of the resulting compressed pulse is approximately 1/B. In the method of the present invention, the CHIRP signal is generated at baseband with bandwidth B. Upon conversion to a higher frequency its bandwidth is doubled to 2B, and upon reception and convolution, the resulting pulsewidth becomes ½B or half that of the compressed pulse in the conventional case. However, the radar designer is not required to accept this improved resolution. In fact, this method is not intended to provide improved range resolution, for reasons discussed presently in connection with pulse energy.

If he needed the improved resolution the designer would have obtained it by doubling the bandwidth of his conventional CHIRP signal. The designer can forego the option of improved resolution resulting from the baseband CHIRP in favor of lower temporal sidelobes. This choice is not available when using conventional CHIRP. The options available to the designer are explained in greater detail below.

Figure 5:
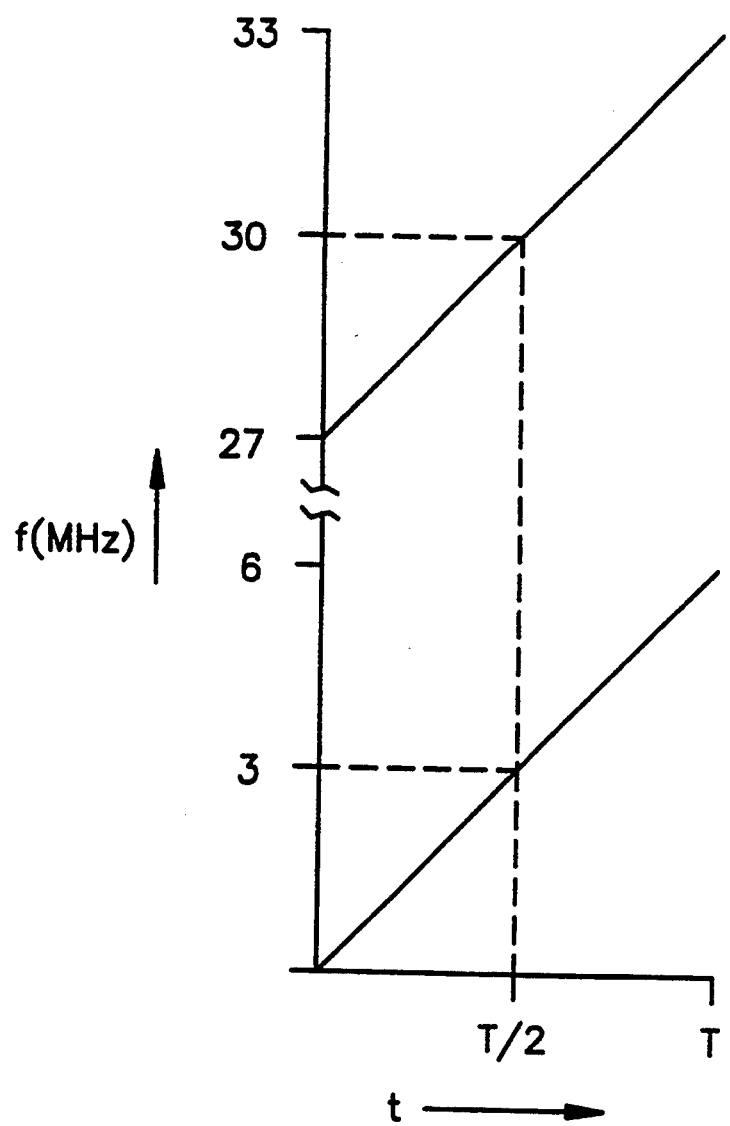
FIG. 5 is a graph showing the frequency versus time relationship of a conventional signal waveform and an improved signal waveform selected in accordance with the present invention.
Figure 6:
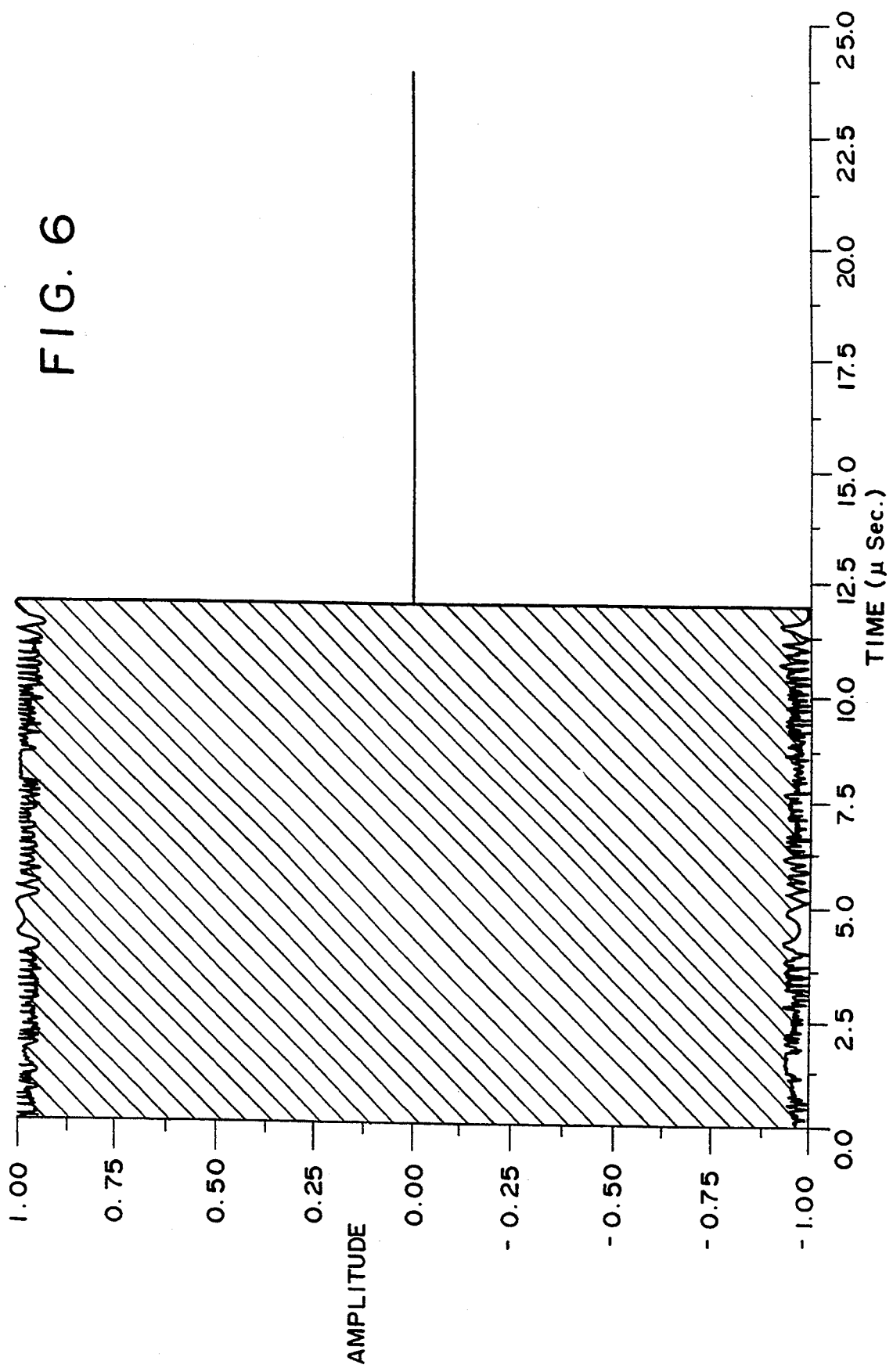
FIG. 6 is a graph showing the transmitter signal pulse generated using the conventional waveform shown in FIG. 5.

FIG. 5 shows the linear frequency versus time relationship of two signal waveforms for generating a linear FM transmitter signal pulse. The upper line represents a carrier waveform generated using a conventional selection of frequency parameters. In this example, the center frequency $f_0 = 30$ MHz, $f_1 = 27$ MHz and $f_2 = 33$ MHz, and the pulse length $T = 12$ $\mu$sec. FIG. 6 shows the resulting transmitter signal pulse generated using these frequency parameters.

FIGS. 7a and 7b both show (on different time scales) the time response of the autocorrelation function of an echo of the aforementioned conventional transmitter signal pulse input into a matched filter. The amplitude of the main lobe is 8.48, and the amplitude of the peak sidelobe, which is equal to the total area under the curve resulting from the product of the return echo of the transmitter signal pulse shown in FIG. 6 and a replica of that transmitter signal pulse, delayed in time by 0.25 μsec is 1.79, which is the amplitude of the peak sidelobe shown in the arrow of FIG. 7b. The location of the peak sidelobe appears at t=1.5/B=1.5/6=0.25 usec from the peak pulse. The main-to-peak sidelobe (M/S) ratio attained using this transmitter signal pulse is 13.5 dB.

Figure 8:
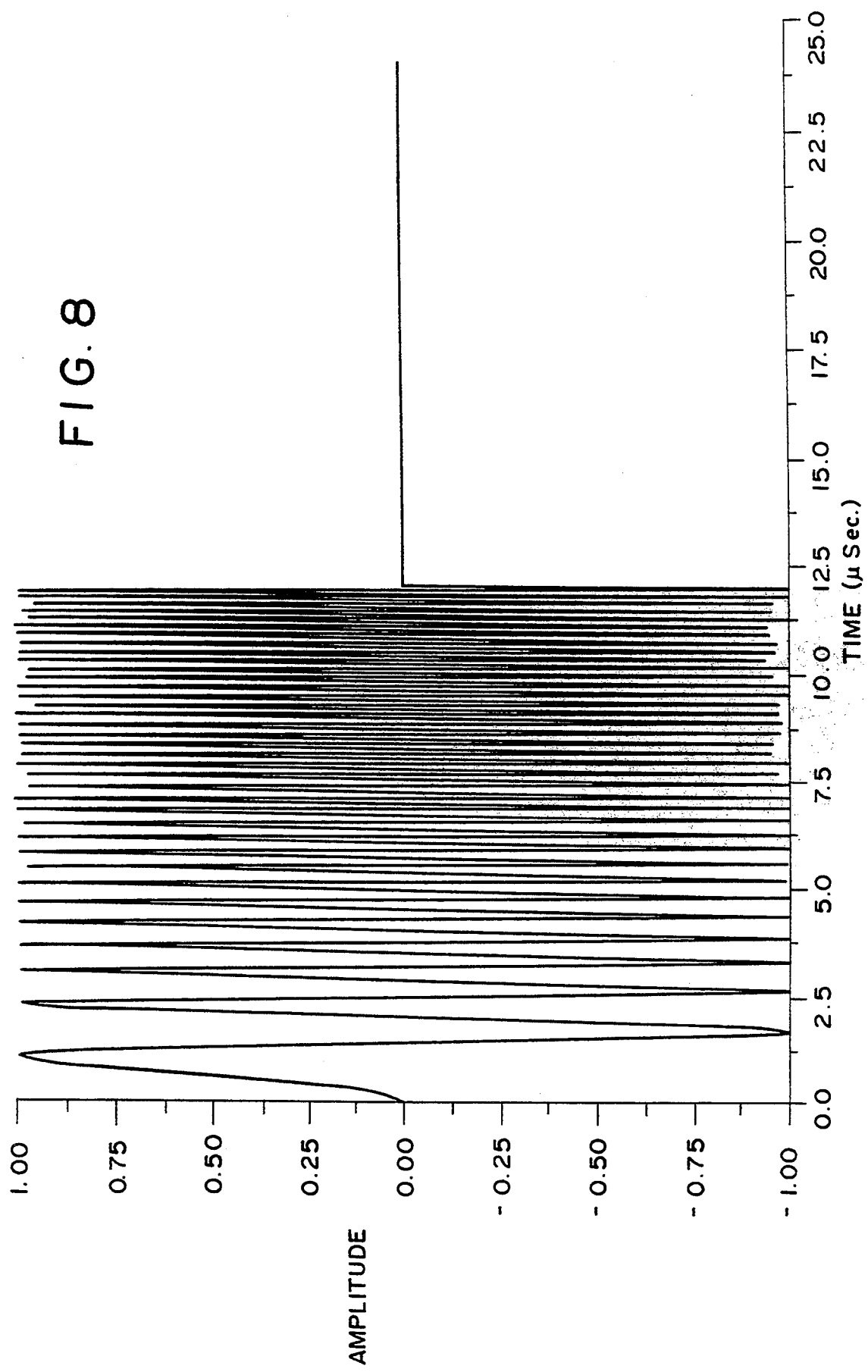
FIG. 8 is a graph showing the improved transmitter signal pulse generated using the waveform as depicted in the lower curve of FIG. 5.

The lower line in FIG. 5 shows a carrier waveform having a selection of frequency parameters in accordance with the present invention. In this example, the carrier waveform increases linearly over time between a minimum frequency $f_1=0$ MHz and a maximum frequency $f_2=6$ MHz and with a center frequency $f_0=3$ MHz. The transmitter signal pulse that results using these parameters is shown in FIG. 8. (The selection of 0 MHz for $f_1$ is merely for illustrative purposes to simplify the description. Although this value maximizes the percentage cycle-to-cycle frequency variation, a slightly larger value of $f_1$ further increases the M/S ratio of the compressed pulse, as will be explained.)

Figure 9A:
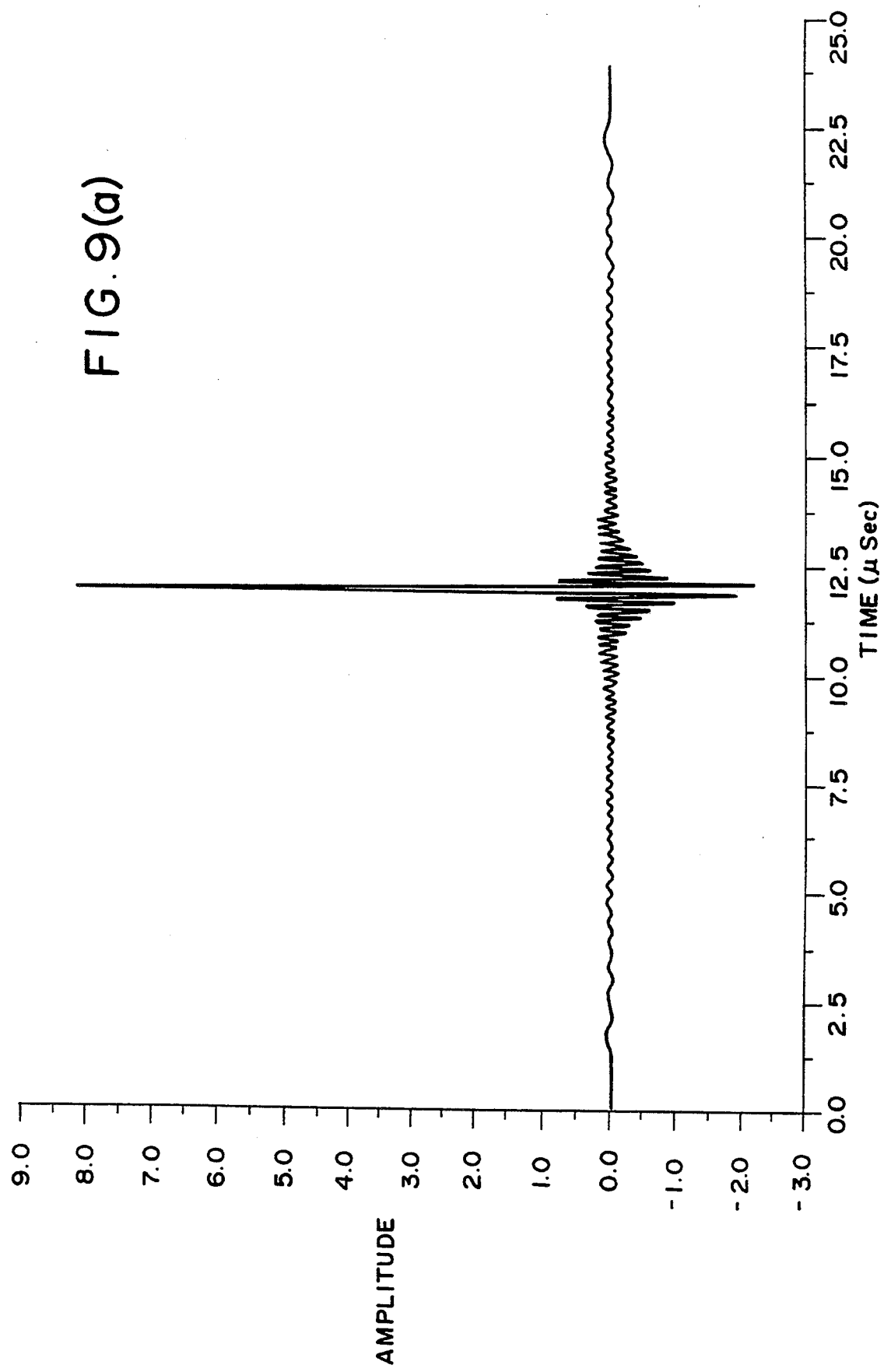

FIGS. 9a and 9b show the autocorrelation function output, on different time scales, generated for a return echo corresponding to a transmitter signal pulse of the present invention input into a matched filter.

The benefits claimed for the method of the present invention can best be visualized by superimposing the compressed pulses for the conventional and the baseband cases on the same time scale. This is done in FIG. 10a, in which the broken line curve represents the conventional compressed pulse of FIG. 7A (on a different time scale) and the solid curve represents the compressed pulse resulting from the improved transmitter signal of FIG. 8.

Figure 10A:
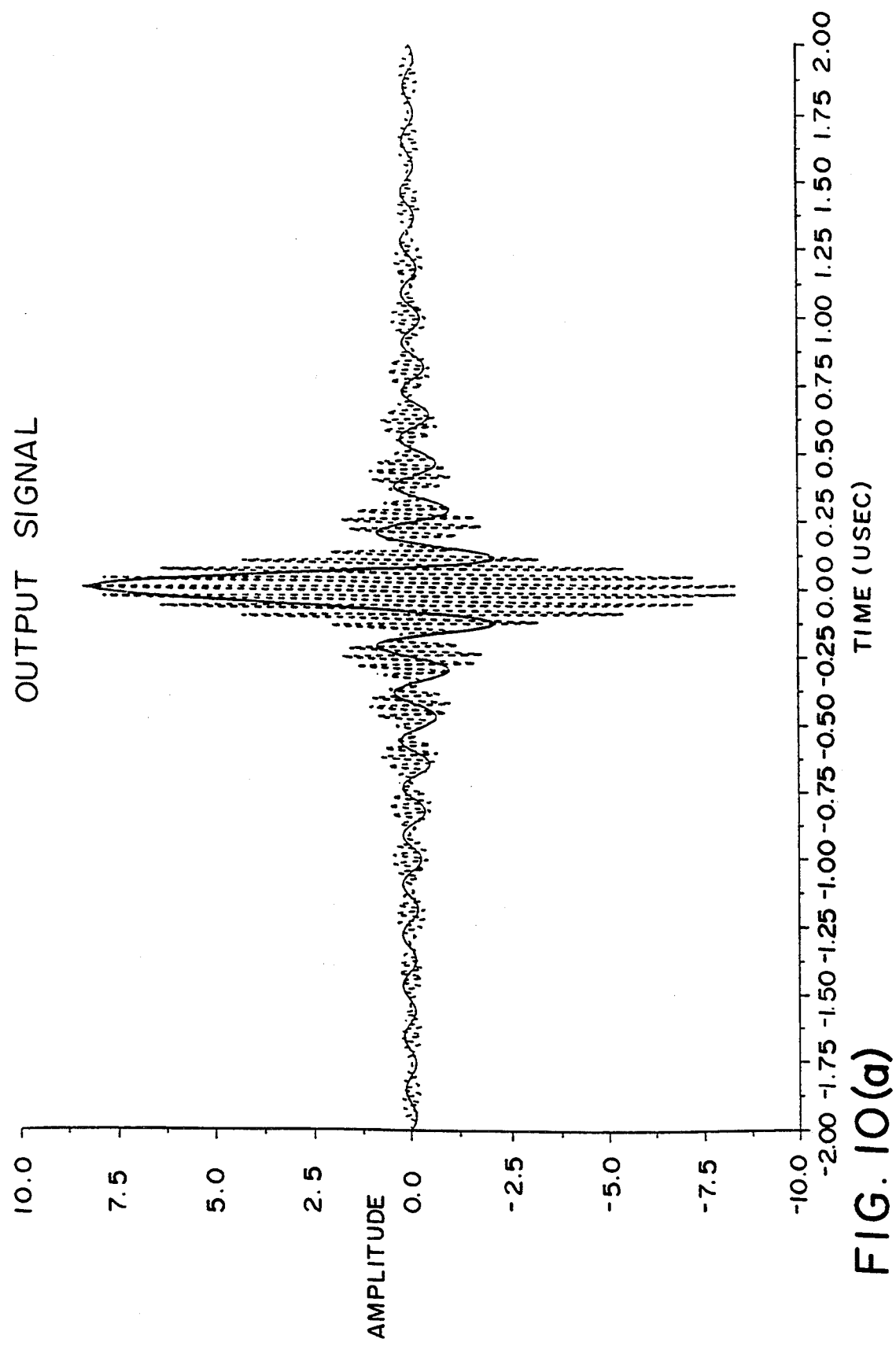
FIG. 10a is a graph showing the superimposed compressed pulses of the conventional and improved transmitter pulse signals.

As FIG. 10a shows, the pulse width of the baseband CHIRP signal is smaller than that of the conventional CHIRP signal. However, the designer has, by implication, accepted the range resolution of the conventional signal. As stated previously, the designer is not using the method to improve range resolution; (if he needed the improved resolution, he would have doubled the conventional CHIRP bandwidth). Having accepted the conventional resolution, he must evaluate the baseband CHIRP using the same value. As FIG. 10a shows, when the same time interval corresponding to 1/B is selected for comparison, the first negative "spike" of the solid curve (which would be considered a temporal sidelobe if the theoretical ½B resolution were chosen by the designer) is clearly part of the main pulse. In fact, an energy calculation shows that the sum of the energies in the central solid pulse and the two surrounding negative spikes is the same as the energy of the conventional pulse calculated in the same time interval. In contrast, if the theoretical ½B resolution had been chosen, the resulting narrower main pulse would be more difficult to detect because of the significantly smaller energy in that pulse. It is for this reason that this method is not suggested for improving range resolution.

Figure 10B:
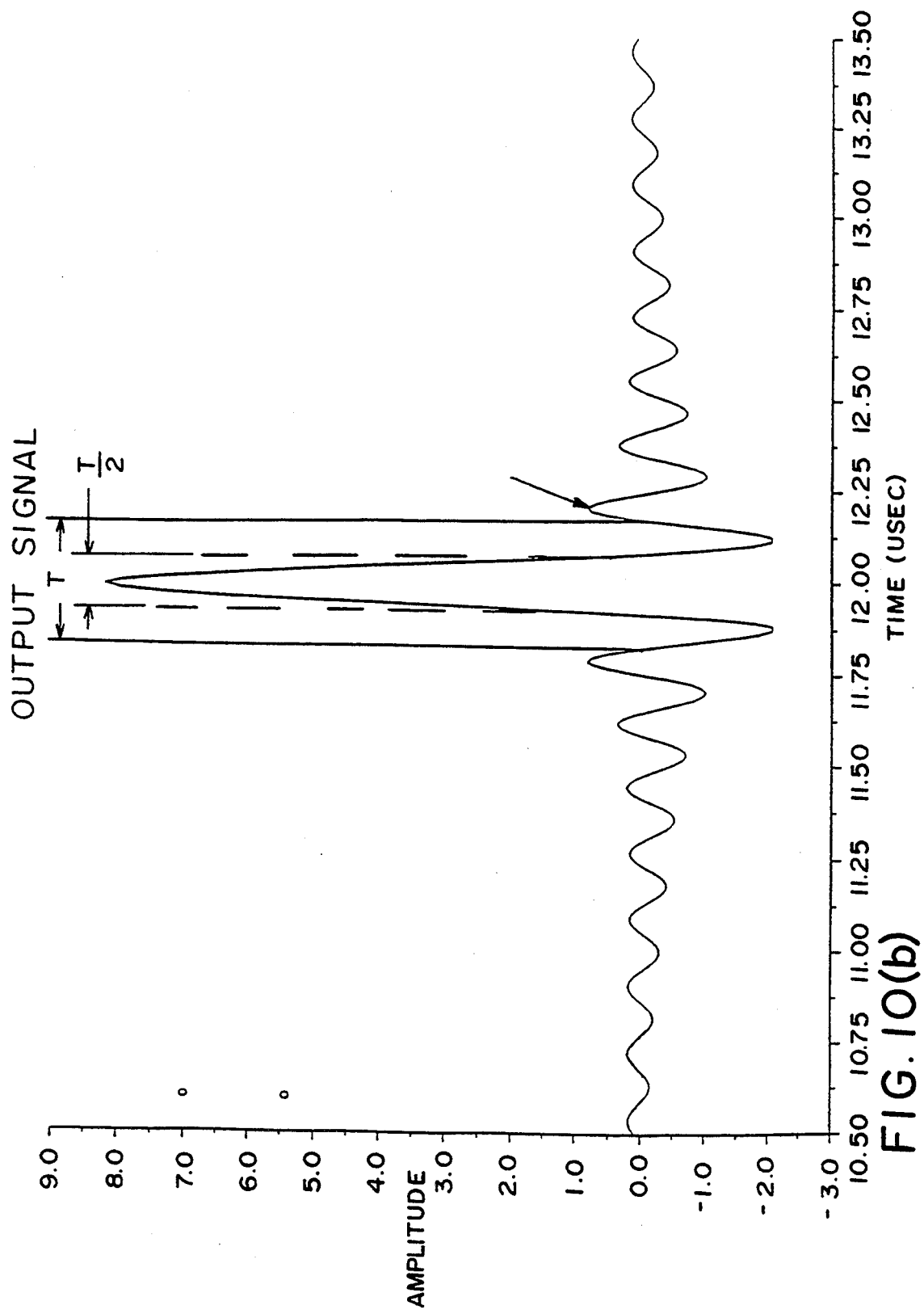
FIG. 10b is a graph showing the compressed pulse of the improved transmitter pulse signal on an expanded time scale.

To clarify this, FIG. 10b again shows the compressed pulse resulting from the improved approach. The indicated pulse width, T/2, of 0.072 microseconds is about one-half the width of the conventional pulse in FIG. 10a. Two possible range resolutions are shown, reflecting the options available to the designer. Selecting the range gate size of T/2 yields better resolution but a higher temporal sidelobe, represented by the first negative spike which is outside the main pulse. The preferred option, range gate size T, forgoes the improved resolution, and retains the resolution of the conventional compressed pulse. By doing so, the negative spikes become part of the main pulse. The peak sidelobe, indicated by the arrow in FIG. 10b has therefore been reduced to a value of 0.84. The pulse amplitude has remained essential the same at 8.23, and the resulting M/S ratio has risen to 19.8dB, which represents an increase of 6.3dB over the M/S ratio achieved in the conventional case.

Thus the transmitter signal used in accordance with the present invention produces a significant reduction in the amplitude of the peak temporal sidelobe without a corresponding significant decrease in the amplitude of the main pulse. In addition, the compressed pulse width and the location of the peak sidelobe are essentially unchanged.

Thus, the example above shows that a signal waveform used to generate a transmitter signal pulse of the present invention results in a significant reduction in the amplitude of the temporal sidelobes in the autocorrelation function output of a matched filter, but with a substantially unchanged amplitude of the main lobe, thus increasing the M/S ratio.

The slope of the carrier waveform, alternatively, may be negative. In such case, the frequency of the sinusoidal signal is decreased linearly and frequency parameter $f_2=0$ in the above example.

A selection of frequency parameters for the signal waveform in accordance with the present invention also advantageously eliminates the need for additional hardware to reduce the output of the matched filter down to baseband frequency, as is required in conventional linear FM pulse compression radar systems. This is true because the output of the matched filter using the signal waveform of the present invention is a compressed pulse signal which is already at baseband. In contrast, the compressed pulse signal output in a conventional linear FM pulse compression radar is located at an intermediate frequency and thus must be extracted using video detection techniques.

The description of the lower line in FIG. 5 stated that a value of $f_1$ larger than 0 MHz will provide a larger M/S ratio in the compressed pulse. When $f_1=0$ MHz, the center frequency $f_0$ is equal to one-half the bandwidth B and the percentage cycle-to-cycle frequency variation is maximized. A large number of computer runs performed for a variety of values of k, B, and CR has shown that the M/S ratio is maximized when the center frequency is set to six-tenths (0.6) of the value of B. When $f_0$ is set to this value, it follows that $f_1$ has a value of one-tenth (0.1) of B, instead of 0. In FIG. 5, B=6 MHz. If $f_1=0.1B=0.6$ MHz, $f_0=0.6B=3.6$ MHz, and $f_2=f_0+B/2=6.6$ MHz and T does not change, then the resulting compressed pulse is shown in FIG. 11. The peak value is 8.47, the peak sidelobe, shown by the arrow, has a value of 0.44 and the M/S ratio is 25.6 dB. This is a 5.8 dB increase over the M/S ratio obtained in FIG. 10b. The M/S ratio is, therefore, maximized when $f_1$ is set close but not equal to 0.

The method of the present invention analogously may be used to improve the target-detection performance capability of antenna arrays. An antenna directivity pattern is the fourier transform of the array illumination function, just as the compressed pulse is the inverse fourier transform of the output spectrum of a matched filter. Thus a properly scaled output spectrum generated using a signal waveform having a set of frequency parameters contemplated by the present invention, when used as an antenna illumination function, will result in an antenna pattern with significantly lower sidelobes than can be obtained using a uniform array.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for improving the target-detection performance of a linear pulse compression radar system by effecting a reduction of the temporal sidelobes of the autocorrelation function output signal, said radar system comprising a transmitter having a frequency modulator for creating a transmitter signal pulse and a receiver comprising a matched filter for compressing a return echo of a transmitter signal pulse, said method comprising the steps of:

generating a transmitter signal pulse using a waveform which varies the frequency of a baseband signal between first and second frequencies; and selecting said first and second frequencies so as to optimize the percent cycle-to-cycle frequency variation in the transmitter signal pulse, said variation causing a correlation function between an echo of the transmitter signal pulse and a time-delayed replica of the transmitter signal pulse to reduce the amplitude of the temporal sidelobes of the autocorrelation function output of said matched filter.

2. The method specified in claim 1, further comprising the step of modulating the frequency of the transmitter waveform so that the frequency increases linearly between said first and second frequencies.

3. The method of claim 2, wherein said modulating step comprises the step of setting said first frequency $f_1$ to a value close to 0 MHz.

4. The method specified in claim 1, further comprising the step of modulating the frequency of the transmitter waveform so that the frequency decreases linearly between said first and second frequencies.

5. The method of claim 4, wherein said modulating step comprises the step of setting said second frequency $f_2$ to a value close to 0 MHz.

6. An apparatus for improving the target-detection performance of a linear pulse compression radar system by effecting a reduction of the temporal sidelobes of the autocorrelation function output signal of a matched filter receiver, said radar system comprising a transmitter having a frequency modulator for creating a transmitter signal pulse and a receiver comprising a pulse compression filter for compressing a return echo of a transmitter signal pulse, said apparatus comprising:

means for generating a transmitter signal pulse using a waveform which varies the frequency of a baseband signal between first and second frequencies; and means for selecting said first and second frequencies so as to optimize the percent cycle-to-cycle frequency variation in the transmitter signal pulse, said variation causing a correlation function between an echo of the transmitter signal pulse and a time-delayed replica of the transmitter signal pulse to reduce the amplitude of the temporal sidelobes of the autocorrelation function output of said matched filter.

7. The apparatus specified in claim 6, further comprising means for modulating the frequency of the transmitter waveform so that the frequency increases linearly between said first and second frequencies.

8. The apparatus of claim 7, wherein said frequency modulating means adjusts said first frequency $f_1$ to a value close to 0 MHz.

9. The apparatus specified in claim 6, further comprising means for modulating the frequency of the transmitter waveform so that the frequency decreases linearly between said first and second frequencies.

10. The apparatus of claim 9, wherein said frequency modulating means adjusts said second frequency $f_2$ to a value close to 0 MHz.

* * * * *